United States Patent
Zhang et al.

(10) Patent No.: US 12,406,999 B2
(45) Date of Patent: Sep. 2, 2025

(54) POSITIVE ELECTRODE MATERIAL, ELECTROCHEMICAL DEVICE THAT USES SAME, AND ELECTRONIC DEVICE

(71) Applicant: Ningde Amperex Technology Limited, Fujian (CN)

(72) Inventors: Fei Zhang, Fujian (CN); Kai Wang, Fujian (CN); Leimin Xu, Fujian (CN); Meng Wang, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 712 days.

(21) Appl. No.: 17/700,909

(22) Filed: Mar. 22, 2022

(65) Prior Publication Data

US 2022/0216481 A1 Jul. 7, 2022

Related U.S. Application Data

(63) Continuation of application No. PCT/CN2021/078900, filed on Mar. 3, 2021.

(30) Foreign Application Priority Data

Mar. 11, 2020 (CN) .......................... 202010163888.6

(51) Int. Cl.
*H01M 4/62* (2006.01)
*H01M 4/131* (2010.01)
*H01M 4/505* (2010.01)
*H01M 4/525* (2010.01)
*H01M 10/0525* (2010.01)
*H01M 4/02* (2006.01)

(52) U.S. Cl.
CPC .......... *H01M 4/628* (2013.01); *H01M 4/131* (2013.01); *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| 2015/0104708 A1* | 4/2015 | Bi ......................... H01M 4/525 264/618 |
| 2017/0279162 A1* | 9/2017 | Vissers ............ H01M 10/0525 |
| 2020/0388842 A1* | 12/2020 | Choi ................. H01M 10/0525 |

FOREIGN PATENT DOCUMENTS

| CN | 103872375 A | 6/2014 |
| CN | 104347870 A | 2/2015 |

(Continued)

OTHER PUBLICATIONS

Office Action issued on Dec. 4, 2020, in connection with corresponding Chinese Application No. 202010163888.6 ; 7 pages.

(Continued)

*Primary Examiner* — Alix E Eggerding
(74) *Attorney, Agent, or Firm* — Maier & Maier, PLLC (57) ABSTRACT

A positive electrode material, an electrochemical device that uses same, and an electronic device. Specifically, a positive is a layered structure. The layered structure includes a strip-like structure containing an atom cluster. The positive electrode material according to this application helps to improve cycle performance and storage performance of the electrochemical device under a high voltage working condition.

14 Claims, 3 Drawing Sheets

(56) References Cited

FOREIGN PATENT DOCUMENTS

| | | | |
|---|---|---|---|
| CN | 104937754 | A | 9/2015 |
| CN | 105140502 | A | 12/2015 |
| CN | 108140821 | A | 6/2018 |
| CN | 108558959 | A | 9/2018 |
| CN | 109417170 | A | 3/2019 |
| CN | 109476491 | A | 3/2019 |
| CN | 109817907 | A | 5/2019 |
| CN | 109891641 | A | 6/2019 |
| CN | 109994729 | A | 7/2019 |
| CN | 110120505 | A | 8/2019 |
| CN | 110137443 | A | 8/2019 |
| CN | 110336006 | A | 10/2019 |
| CN | 111354946 | A | 6/2020 |
| WO | 2013148138 | A1 | 10/2013 |

OTHER PUBLICATIONS

International Search Report (with English Translation) and Written Opinion (with Machine Translation) issued on Jun. 9, 2021 in corresponding International Patent Application No. PCT/CN2021/078900; 14 pages.

Partial Supplementary Search Report issued on Aug. 2, 2022, in corresponding European Application No. 21767912.5, 8 pages.

Extended Search Report issued on Jan. 9, 2023, in corresponding European Application No. 21767912.5, 12 pages.

Okubo et al., "Nanosize Effect on High-Rate Li-Ion Intercalation in $LiCoO_2$ Electrode", Journal of the American Chemical Society, American Chemical Society, XP055945867, ISSN: 0002-7863, May 19, 2007, vol. 129, No. 23, 9 pages.

Boonlakhorn et al., "Effects of DC Bias on Dielectric and Electrical Responses in (Y + Zn) Co-Doped $CaCu_3Ti_4O_{12}$ Perovskite Oxides", Journal of Materials Science: Materials in Electronics, Springer Science+Business Media, XP093010570, ISSN: 0957-4522, Nov. 21, 2016, vol. 28, No. 6, 7 pages.

Rani et al., "Dielectric and Impedance Studies of La and Zn Co-Doped Complex Perovskite $CaCu_3Ti_4O_{12}$", Ceramics International, Elsevier Ltd and Techna Group S.R.L., XP093010522, ISSN: 0272-8842, Sep. 13, 2018, vol. 44, No. 6, 12 pages.

Duan et al., "Zr and Y Co-Doped Perovskite as a Stable, High Performance Cathode for Solid Oxide Fuel Cells Operating Below 500C", Energy & Environmental Science, The Royal Society of Chemistry, XP093010520, ISSN: 1754-5692, Oct. 7, 2016, vol. 10, No. 1, 8 pages.

Yao et al., "Characterization of Ta/W Co-Doped $SrFeO_3$ Perovskite as Cathode for Solid Oxide Fuel Cells", Journal of Alloys and Compounds, Elsevier B.V., XP093010525, ISSN: 0925-8388, May 9, 2019, vol. 797, 8 pages.

\* cited by examiner

POSITIVE ELECTRODE MATERIAL, ELECTROCHEMICAL DEVICE THAT USES SAME, AND ELECTRONIC DEVICE

CROSS REFERENCE TO THE RELATED APPLICATIONS

The present application is a National Stage application of PCT international application: PCT/CN2021/078900, filed on Mar. 3, 2021, which claims the benefit of priority from the China Patent Application No. 202010163888.6, filed on Mar. 11, 2020, the disclosure of which is hereby incorporated by reference in its entirety.

TECHNICAL FIELD

This application relates to the field of energy storage, and in particular, to a positive electrode material, an electrochemical device that uses same, and an electronic device.

BACKGROUND

Electrochemical devices (such as a lithium-ion battery) are widely used in the fields such as wearable devices, smartphones, unmanned aerial vehicles, electric vehicles, and large-scale energy storage equipment by virtue of advantages such as a high energy density, a long cycle life, and no memory effect, and have become the most promising new green chemical power source in the world today.

Under a high-voltage working condition, by-products are likely to be generated on a surface of a positive electrode of a lithium-ion battery, thereby affecting the cycle performance of the lithium-ion battery. The surface of the positive electrode, which is coated with a conventional oxide or fluoride, reduces contact between an electrolyte and a positive electrode material and hinders passage of lithium ions, thereby adversely affecting the performance of the lithium-ion battery.

In view of this, it is necessary to provide an improved positive electrode material.

SUMMARY

This application provides a positive electrode material of a layered structure to solve at least one problem in the related art to at least some extent.

According to an aspect of this application, this application provides a positive electrode material. The positive electrode material have a layered structure. The layered structure includes a strip-like structure containing an atom cluster.

According to an embodiment of this application, an element M1 is contained between two adjacent layers in the layered structure, and the element M1 is at least one selected from Y or Ca; and the layered structure contains an element M2, and the element M2 includes at least two selected from La, Ho, Zr, Sc, W, Ce, Mo, Nb, Hf, Zn, or Ti.

According to an embodiment of this application, the element M1 is contained between two adjacent layers in the strip-like structure.

According to an embodiment of this application, the atom cluster contains the element M2.

According to an embodiment of this application, a spacing between two adjacent strip-like structures is 0.5 nm to 0.75 nm, and a sum of a total thickness of the strip-like structures and the aggregate spacing between the strip-like structures is less than or equal to 10 nm.

In some embodiments, a spacing between two adjacent strip-like structures is within a range of 0.55 nm to 0.7 nm. In some embodiments, the spacing between two adjacent strip-like structures is approximately 0.55 nm, approximately 0.60 nm, approximately 0.65 nm, or approximately 0.70 nm, or within a range formed by any two thereof.

In some embodiments, the sum of the total thickness of the strip-like structures and the aggregate spacing between the strip-like structures is not greater than 8 nm. In some embodiments, the sum of the total thickness of the strip-like structures and the aggregate spacing between the strip-like structures is not greater than 5 nm. In some embodiments, the sum of the total thickness of the strip-like structures and the aggregate spacing between the strip-like structures is approximately 3 nm, approximately 4 nm, approximately 5 nm, approximately 6 nm, approximately 7 nm, approximately 8 nm, approximately 9 nm, or approximately 10 nm, or within a range formed by any two thereof.

According to an embodiment of this application, based on a total weight of the positive electrode material, a content of the element M1 is within a range of 0.08 wt % to 0.5 wt %, and a content of the element M2 is within a range of 0.04 wt % to 0.5 wt %.

In some embodiments, based on the total weight of the positive electrode material, the content of the element M1 is within a range of approximately 0.1 wt % to approximately 0.5 wt %. In some embodiments, based on the total weight of the positive electrode material, the content of the element M1 is approximately 0.08 wt %, approximately 0.10 wt %, approximately 0.12 wt %, approximately 0.15 wt %, approximately 0.18 wt %, approximately 0.2 wt %, approximately 0.25 wt %, approximately 0.3 wt %, approximately 0.35 wt %, or approximately 0.4 wt %, or within a range formed by any two thereof.

In some embodiments, based on the total weight of the positive electrode material, the content of the element M2 is within a range of 0.05 wt % to 0.10 wt %. In some embodiments, based on the total weight of the positive electrode material, the content of the element M2 is within a range of 0.06 wt % to 0.08 wt %. In some embodiments, based on the total weight of the positive electrode material, the content of the element M2 is approximately 0.04 wt %, approximately 0.05 wt %, approximately 0.08 wt %, approximately 0.10 wt %, approximately 0.12 wt %, approximately 0.14 wt %, approximately 0.2 wt %, approximately 0.25 wt %, approximately 0.3 wt %, or approximately 0.35 wt %, or within a range formed by any two thereof.

According to an embodiment of this application, the layered structure includes an oxide of the element M1 and an oxide of the element M2. In some embodiments, the oxide of the element M1 includes at least one of $Y_2O_3$ or CaO. In some embodiments, the oxide of the element M2 includes at least two of $La_2O_3$, $Ho_2O_3$, $ZrO_2$, $Sc_2O_3$, $WO_3$, $CeO_2$, $MoO_3$, $Nb_2O_5$, $HfO_2$, ZnO, or $TiO_2$.

According to an embodiment of this application, the positive electrode material includes a lithium cobalt oxide, and a Dv99:Dv50 ratio of the lithium cobalt oxide is within a range of 2.2 to 2.8. In some embodiments, the lithium cobalt oxide includes lithium cobaltate ($LiCoO_2$). In some embodiments, the Dv99:Dv50 ratio of the lithium cobalt oxide is approximately 2.2, approximately 2.3, approximately 2.4, approximately 2.5, approximately 2.6, approximately 2.7, or approximately 2.8.

According to an embodiment of this application, the positive electrode material includes a ternary material. The ternary material is $LiNi_aCo_bMn_cO_2$ or $LiNi_dCo_eAl_fO_2$, where $a+b+c \leq 1$, $0<a<1$, $0<b<1$, $0<c<1$; and $d+e+f \leq 1$, where $0<d<1$, $0<e<1$, $0<f<1$; and a Dv99:Dv50 ratio of the ternary material is within a range of 2.2 to 2.8. In some embodiments, the ternary material includes at least one of $LiNi_{1/3}Co_{1/3}Mn_{1/3}O_2$, $LiNi_{0.5}Co_{0.2}Mn_{0.3}O_2$, $LiNi_{0.8}Co_{0.1}Mn_{0.1}O_2$, $LiNi_{0.6}Co_{0.2}Mn_{0.2}O_2$, $LiNi_{0.8}Co_{0.15}Al_{0.05}O_2$, or $LiNi_{0.88}Co_{0.11}Mn_{0.11}O_2$. In some embodiments, the Dv99:Dv50 ratio of the ternary material is approximately 2.2, approximately 2.3, approximately 2.4, approximately 2.5, approximately 2.6, approximately 2.7, or approximately 2.8.

According to another aspect of this application, this application provides an electrochemical device, including a positive electrode, a negative electrode, and an electrolytic solution. The positive electrode includes the positive electrode material according to an embodiment of this application.

According to still another aspect of this application, this application provides an electronic device, including the electrochemical device according to an embodiment of this application.

Additional aspects and advantages of this application will be described or illustrated in part later herein or expounded through implementation of the embodiments of this application.

DETAILED DESCRIPTION OF EMBODIMENTS

Embodiments of this application will be described in detail below. The embodiments of this application are not to be construed as a limitation on this application.

The term "approximately" used herein is intended to describe and represent small variations. When used with reference to an event or situation, the terms may denote an example in which the event or situation occurs exactly and an example in which the event or situation occurs very approximately. For example, when used together with a numerical value, the term may represent a variation range falling within ±10% of the numerical value, such as ±5%, ±4%, ±3%, ±2%, ±1%, ±0.1%, or ±0.05% of the numerical value. In addition, a quantity, a ratio, or another numerical value is sometimes expressed in a range format herein. Understandably, such a range format is for convenience and brevity, and shall be flexibly understood to include not only the numerical values explicitly specified and defined in the range, but also all individual numerical values or sub-ranges covered in the range as if each individual numerical value and each sub-range were explicitly specified.

In the detailed description of embodiments and claims, a list of items referred to by using the terms such as "at least one of" may mean any combination of the listed items. For example, if items A and B are listed, the phrases "at least one of A and B" and "at least one of A or B" mean: A alone; B alone; or both A and B. In another example, if items A, B, and C are listed, the phrases "at least one of A, B, and C" and "at least one of A, B, or C" mean: A alone; B alone; C alone; A and B (excluding C); A and C (excluding B); B and C (excluding A); or all of A, B, and C. The item A may include a single element or a plurality of elements. The item B may include a single element or a plurality of elements. The item C may include a single element or a plurality of elements.

Positive Electrode

A positive electrode includes a positive current collector and a positive electrode material disposed on the positive current collector. The positive electrode material includes a positive active material. The positive current collector used for the electrochemical device according to this application may be, but is not limited to, aluminum (Al).

The positive electrode material according to this application is characterized by a layered structure. The layered structure includes a strip-like structure containing an atom cluster. "Atom cluster" means a cluster-like structure formed by aggregating at least three atoms. In some embodiments, the layered structure is formed on a surface of the positive active material.

Figure 1:
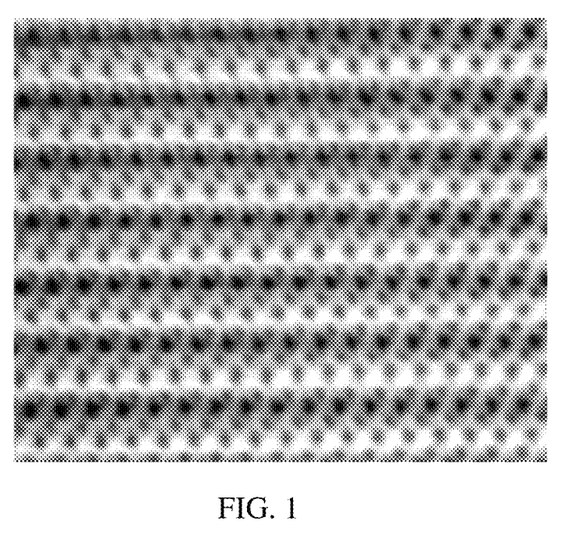
FIG. 1 shows a transmission electron microscope (TEM) image of lithium cobaltate ($LiCoO_2$) in a positive electrode material according to an embodiment of this application.
Figure 2:
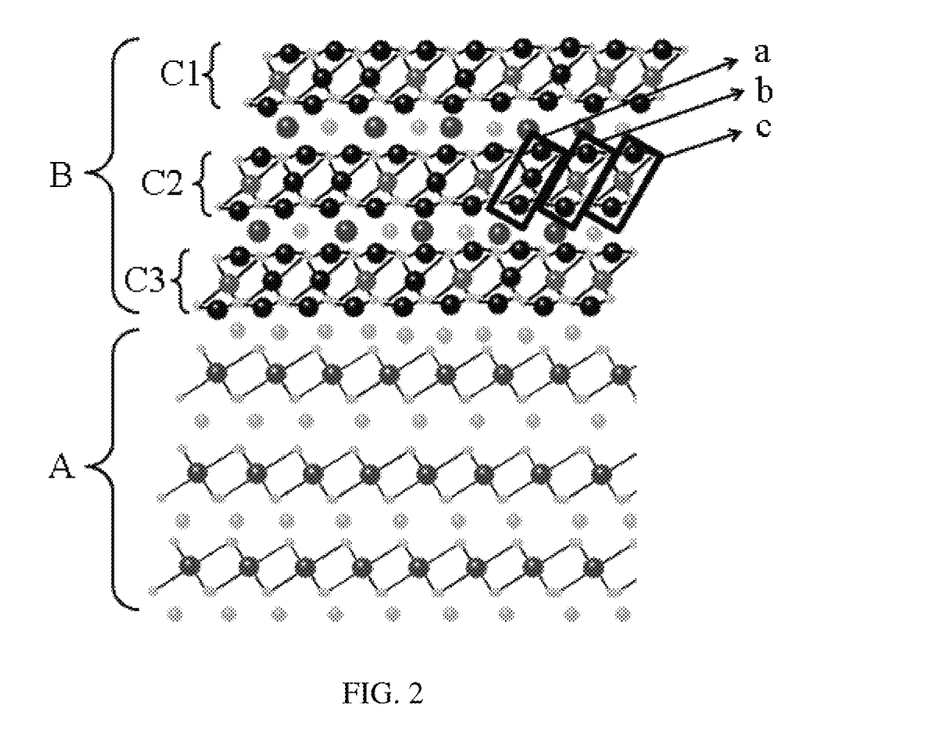
FIG. 2 shows a schematic diagram of a microstructure of a positive electrode material according to an embodiment of this application.
Figure 3:
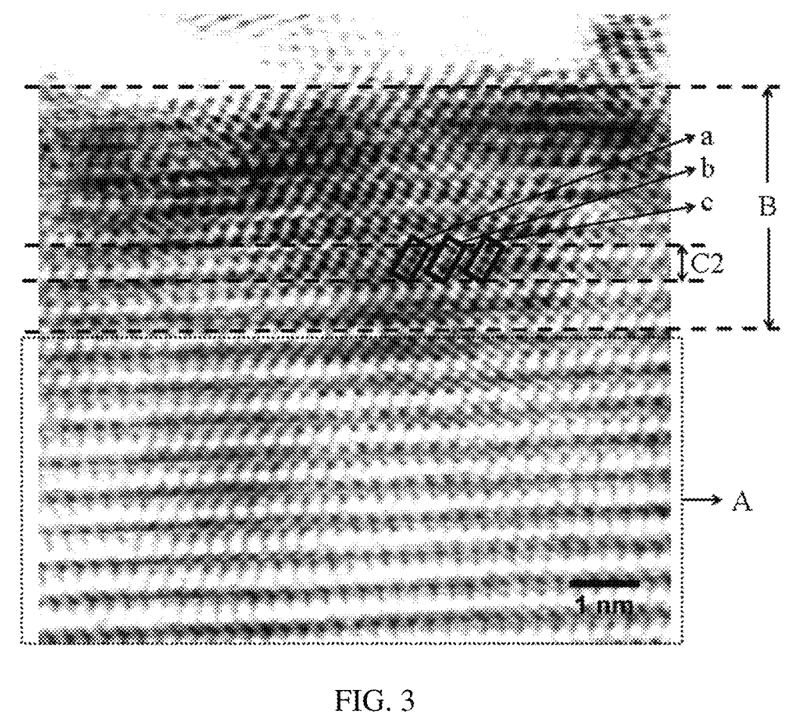
FIG. 3 shows a TEM image of a positive electrode material according to an embodiment of this application.

Lithium cobaltate, lithium manganate, ternary materials, lithium iron phosphate, spinel lithium nickel manganese oxide, and the like are typical positive electrode materials. The lithium cobaltate is widely used because of its high voltage platform and high volumetric energy density. Taking the lithium cobaltate ($LiCoO_2$) as an example, FIG. 1 shows a transmission electron microscope (TEM) image of the lithium cobaltate. A crystal structure of the lithium cobaltate is a layered structure with regular atomic arrangement. When the lithium cobaltate is used as a positive electrode material, over-delithiation is likely to occur near the surface of the positive electrode material during intercalation and deintercalation of lithium ions, resulting in an excessive interlayer spacing in the surface region. Consequently, a superficial Co—O bond is more likely to be disrupted, thereby being extremely detrimental to the cycle performance and storage performance of the lithium-ion battery. To solve such a problem, the positive electrode material according to this application includes a strip-like structure containing an atom cluster. FIG. 2 shows a schematic diagram of a microstructure of a positive electrode material according to an embodiment of this application. The positive electrode material includes a lithium cobaltate ($LiCoO_2$) crystal structure A and a layered structure B. The layered structure B includes strip-like structures C1, C2, and C3. Each strip-like structure includes atom clusters a, b, c, and so on. FIG. 3 shows a transmission electron microscope (TEM) image of a positive electrode material according to an embodiment of this application, verifying that the strip-like structures and the layered structure are formed on the surface of the lithium cobaltate. The strip-like structures can increase aggregation density of atom clusters and increase the structural stability of the positive electrode material, thereby not only effectively suppressing adverse effects arising from the excessive interlayer spacing caused in a deintercalation process of lithium ions, but also stabilizing a (003) crystal plane. The (003) crystal plane is a crystal plane consisting of Co—O bonds in $LiCoO_2$. The (003) crystal plane in a lithium cobaltate particle is usually exposed outside, and is an unstable crystal plane vulnerable to corrosion by an electrolytic solution. In addition, the Co—O bond is likely to be broken in a charge or discharge process, thereby causing structural instability of the material and leading to performance attenuation. A stabilized (003) crystal plane reduces side reactions such as cobalt dissolution caused by crystal plane stripping in a high delithiation state.

In addition, the positive electrode material of a strip-like structure according to this application has few side reactions with the electrolyte under a high voltage, thereby significantly improving an oxygen release phenomenon and a cobalt dissolution phenomenon. This broadens selectivity of the electrolyte. Therefore, the positive electrode material of a strip-like structure according to this application improves the cycle performance and the storage performance under a high-voltage operating condition (for example, at a voltage of at least 4.5 V).

In some embodiments, the element M1 is contained between two adjacent layers in the layered structure. The element M1 is at least one of Y or Ca; and the layered structure contains an element M2, and the element M2 includes at least two of La, Ho, Zr, Sc, W, Ce, Mo, Nb, Hf, Zn, or Ti.

In some embodiments, the element M1 is contained between two adjacent layers in the strip-like structure.

In some embodiments, the atom cluster contains the element M2.

As shown in FIG. 2, the positive electrode material according to this application has layered structure B in which a plurality of elements are arranged heterogeneously. In the layered structure, the element M2 forms atom clusters a, b, c, and the like, and then forms a strip-like structure. The element M1 is formed between two adjacent layers of the strip-like structure. This arrangement effectively increases the aggregation density of atoms, and provides more reliable protection for the surface of the positive electrode. In addition, different elements can coordinate with oxygen to form different types of coordination complexes. The coordination serves a synergistic effect to increase oxygen binding energy and improve the cycle performance and storage performance of the lithium-ion battery.

In some embodiments, a spacing between two adjacent strip-like structures is within a range of 0.5 nm to 0.75 nm. In some embodiments, the spacing between two adjacent strip-like structures is within a range of 0.55 nm to 0.7 nm. In some embodiments, the spacing between two adjacent strip-like structures is approximately 0.55 nm, approximately 0.60 nm, approximately 0.65 nm, or approximately 0.70 nm.

In some embodiments, the sum of the total thickness of the strip-like structures and the aggregate spacing between the strip-like structures is less than or equal to 8 nm. In some embodiments, the sum of the total thickness of the strip-like structures and the aggregate spacing between the strip-like structures is less than or equal to 5 nm. In some embodiments, the sum of the total thickness of the strip-like structures and the aggregate spacing between the strip-like structures is approximately 3 nm, approximately 4 nm, approximately 5 nm, approximately 6 nm, approximately 7 nm, approximately 8 nm, approximately 9 nm, or approximately 10 nm, or within a range formed by any two thereof. The "total thickness of the strip-like structure" means a sum of thicknesses of all strip-like structures. The "spacing between the strip-like structures" means the spacing between any two adjacent strip-like structures. As shown in FIG. 2, the total thickness of the strip-like structures is a sum of thicknesses of the strip-like structures C1, C2, and C3. The spacing between the strip-like structures is a sum of a spacing between the strip-like structures C1 and C2 and a spacing between the strip-like structures C2 and C3. The sum of the total thickness of the strip-like structures and the aggregate spacing between the strip-like structures is a thickness of the layered structure B.

In some embodiments, based on the total weight of the positive electrode material, the content of the element M1 is within a range of 0.08 wt % to 0.5 wt %. In some embodiments, based on the total weight of the positive electrode material, the content of the element M1 is within a range of 0.1 wt % to 0.15 wt %. In some embodiments, based on the total weight of the positive electrode material, the content of the element M1 is approximately 0.08 wt %, approximately 0.10 wt %, approximately 0.12 wt %, approximately 0.15 wt %, approximately 0.18 wt %, approximately 0.2 wt %, approximately 0.25 wt %, approximately 0.3 wt %, approximately 0.4 wt %, or approximately 0.5 wt %, or within a range formed by any two thereof.

In some embodiments, based on the total weight of the positive electrode material, the content of the element M2 is within a range of 0.04 wt % to 0.5 wt %. In some embodiments, based on the total weight of the positive electrode material, the content of the element M2 is within a range of 0.05 wt % to 0.4 wt %. In some embodiments, based on the total weight of the positive electrode material, the content of the element M2 is within a range of 0.06 wt % to 0.3 wt %. In some embodiments, based on the total weight of the positive electrode material, the content of the element M2 is approximately 0.04 wt %, approximately 0.05 wt %, approximately 0.08 wt %, approximately 0.10 wt %, approximately 0.12 wt %, approximately 0.14 wt %, approximately 0.2 wt %, approximately 0.25 wt %, approximately 0.3 wt %, or approximately 0.35 wt %, or within a range formed by any two thereof.

In some embodiments, the layered structure includes an oxide of the element M1. In some embodiments, the oxide of the element M1 includes at least one of $Y_2O_3$ or CaO.

In some embodiments, the layered structure includes an oxide of the element M2. In some embodiments, the oxide of the element M2 includes at least two of $La_2O_3$, $Ho_2O_3$, $ZrO_2$, $Sc_2O_3$, $WO_3$, $CeO_2$, $MoO_3$, $Nb_2O_5$, $HfO_2$, ZnO, or $TiO_2$.

In some embodiments, the positive electrode material includes a lithium cobalt oxide. In some embodiments, the lithium cobalt oxide includes lithium cobaltate ($LiCoO_2$).

In some embodiments, a Dv99:Dv50 ratio of the lithium cobalt oxide is within a range of approximately 2.2 to approximately 2.8. In some embodiments, the Dv99:Dv50 ratio of the lithium cobalt oxide is approximately 2.2, approximately 2.3, approximately 2.4, approximately 2.5, approximately 2.6, approximately 2.7, or approximately 2.8, or within a range formed by any two thereof.

In some embodiments, the positive electrode material includes a ternary material. In some embodiments, the ternary material is $LiNi_aCo_bMn_cO_2$ or $LiNi_dCo_eAl_fO_2$, where $a+b+c\leq1$, $0<a<1$, $0<b<1$, $0<c<1$; and $d+e+f\leq1$, where $0<d<1$, $0<e<1$, $0<f<1$. In some embodiments, the ternary material includes at least one of $LiNi_{1/3}Co_{1/3}Mn_{1/3}O_2$, $LiNi_{0.5}Co_{0.2}Mn_{0.3}O_2$, $LiNi_{0.8}Co_{0.1}Mn_{0.1}O_2$, $LiNi_{0.6}Co_{0.2}Mn_{0.2}O_2$, $LiNi_{0.8}Co_{0.15}Al_{0.05}O_2$, or $LiNi_{0.88}Co_{0.11}Mn_{0.11}O_2$.

In some embodiments, the Dv99:Dv50 ratio of the ternary material is within a range of 2.2 to 2.8. In some embodiments, the Dv99:Dv50 ratio of the ternary material is approximately 2.2, approximately 2.3, approximately 2.4, approximately 2.5, approximately 2.6, approximately 2.7, or approximately 2.8, or within a range formed by any two thereof.

In some embodiments, the positive electrode material further includes a binder, and optionally, further includes a positive conductive material.

The binder improves bonding between particles of the positive active material and bonding between the positive active material and a current collector. Examples of the binder include, but are not limited to, polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, and nylon.

In some embodiments, the positive electrode material further includes a positive conductive material, thereby making the electrode electrically conductive. The positive conductive material may include any conductive material so long as the conductive material does not cause a chemical change. Examples of the positive conductive material include, but are not limited to, a carbon-based material (for example, natural graphite, artificial graphite, carbon black, acetylene black, Ketjen black, and carbon fiber), a metal-based material (for example, metal powder, metal fiber, including copper, nickel, aluminum, silver, and the like), a conductive polymer (for example, a polyphenylene derivative), and any mixture thereof.

In some embodiments, the positive electrode material is prepared by using a hybrid solid-phase sintering method.

In some embodiments, the positive electrode material is prepared by sintering a combination of the oxide of M1 element, the oxide of M2 element, and a precursor material.

In some embodiments, the positive electrode material is prepared by the following steps:

(1) taking a specific amount of the oxide of the M1 element, the oxide of the M2 element, and lithium salt, where a mass ratio of the oxide of the M1 element to the lithium salt is 0.02% to 0.16%, and a mass ratio of the oxide of the M2 element to the lithium salt is 0.01% to 0.12%; and mixing the foregoing materials;

(2) mixing the precursor material with the mixture made in step (1), and stirring for approximately 2 to 4 hours; and (3) sintering the mixture obtained in step (2) for 6 to 8 hours, and then naturally cooling the mixture to obtain a positive electrode material.

In some embodiments, the method for preparing the positive electrode material further includes:

(4) performing stream crushing on the positive electrode material obtained in step (3), passing the crushed material through a 500-mesh screen, and performing vacuum-packaging.

In some embodiments, in step (2), a stirring speed is 35 rpm to 60 rpm.

In some embodiments, in step (3), a heat-up speed of the sintering is approximately 10° C./min, a sintering temperature is 1,000° C. to 1,150° C., and a sintering atmosphere is an oxygen atmosphere.

In some embodiments, the precursor is $Co_3O_4$, and the lithium salt is $Li_2CO_3$.

When $Co_3O_4$ is used as the precursor and $Li_2CO_3$ is used as the lithium salt, the positive electrode material may also be prepared by the following steps:

(a) mixing $Co_3O_4$ and $Li_2CO_3$ so that a molar ratio of Li atoms to Co atoms is within a range of 1.05 to 1.06;

(b) adding the oxide of M1 element and the oxide of the M2 element into the mixture made in step (a), so that a weight percent of the oxide of the M1 element in the total weight is 0.08% to 0.2%, and that a weight percent of the oxide of the M2 element in the total weight is 0.04% to 0.14%; and (c) sintering the mixture obtained in step (b) to obtain a positive electrode material.

In some embodiments, the method for preparing the positive electrode material further includes:

(d) performing stream crushing on the positive electrode material obtained in step (c), passing the crushed material through a 500-mesh screen, and performing vacuum-packaging.

In some embodiments, in step (c), a heat-up speed of the sintering is approximately 10° C./min, a sintering temperature is 1,010° C. to 1,160° C., and a sintering atmosphere is an oxygen atmosphere.

Negative Electrode

A negative electrode includes a current collector and a negative active material layer disposed on the current collector. Specific types of the negative active material are not limited, and may be selected as required.

In some embodiments, the negative active material may be one or more of natural graphite, artificial graphite, mesocarbon microbead (MCMB for short), hard carbon, soft carbon, silicon, a silicon-carbon composite, a Li—Sn alloy, a Li—Sn—O alloy, Sn, SnO, $SnO_2$, spinel-structured lithiated $TiO_2$—$Li_4Ti_5O_{12}$, or a Li—Al alloy.

Examples of the carbonaceous material include, but are not limited to, crystalline carbon, non-crystalline carbon, and a mixture thereof. The crystalline carbon may be amorphous or flake-shaped, mini-flake-shaped, spherical or fibrous natural graphite or artificial graphite. The non-crystalline carbon may be soft carbon, hard carbon, mesophase pitch carbide, calcined coke, and the like.

In some embodiments, the negative active material layer may include a binder, and optionally, may further include a conductive material.

The binder strengthens bonding between particles of the negative active material and bonding between the negative active material and the current collector. Examples of the binder include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, nylon, and the like.

The negative active material layer includes the conductive material, thereby making the electrode electrically conductive. The conductive material may include any conductive material so long as the conductive material does not cause a chemical change. Examples of the conductive material include, but are not limited to, a carbon-based material (for example, natural graphite, artificial graphite, carbon black, acetylene black, Ketjen black, and carbon fiber), a metal-based material (for example, metal powder, metal fiber, including copper, nickel, aluminum, silver, and the like), a conductive polymer (for example, a polyphenylene derivative), and any mixture thereof.

The negative current collector used in this application may be a copper foil, a nickel foil, a stainless steel foil, a titanium foil, foamed nickel, foamed copper, a polymer substrate coated with a conductive metal, or any combination thereof.

Electrolyte

The lithium salt suitable for use in the electrolyte according to embodiments of this application may include, but is not limited to, inorganic lithium salt, for example, $LiClO_4$, $LiAsF_6$, $LiPF_6$, $LiBF_4$, $LiSbF_6$, $LiSO_3F$, and $LiN(FSO_2)_2$; fluorine-containing organic lithium salt, for example, $LiCF_3SO_3$, $LiN(FSO_2)(CF_3SO_2)$, $LiN(CF_3SO_2)_2$, $LiN(C_2F_5SO_2)_2$, cyclic 1,3-hexafluoropropane disulfonimide lithium, cyclic 1,2-tetrafluoroethane disulfonimide lithium, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$; and lithium salt containing a dicarboxylic acid coordination complex, for example, lithium bis(oxalate) borate, lithium difluoro(oxalate) borate, lithium tris(oxalate) phosphate, lithium difluorobis(oxalate) phosphate, and lithium tetrafluoro(oxalate) phosphate. In addition, one of the foregoing lithium salts may be used alone, or two or more thereof may be used simultaneously. In some embodiments, the lithium salt includes a combination of $LiPF_6$ and $LiBF_4$. In some embodiments, the lithium salt includes a combination of an inorganic lithium salt such as $LiPF_6$ or $LiBF_4$ and a fluorine-containing organic lithium salt such as $LiCF_3SO_3$, $LiN(CF_3SO_2)_2$, and $LiN(C_2F_5SO_2)_2$. In some embodiments, a concentration of the lithium salt is within a range of 0.8 mol/L to 3 mol/L, a range of 0.8 mol/L to 2.5 mol/L, a range of 0.8 mol/L to 2 mol/L, a range of 1 mol/L to 2 mol/L. In some embodiments, the concentration of the lithium salt is approximately 1 mol/L, approximately 1.15 mol/L, approximately 1.2 mol/L, approximately 1.5 mol/L, approximately 2 mol/L, or approximately 2.5 mol/L.

Solvents suitable for use in the electrolyte according to the embodiments of this application include, but are not limited to, cyclic carbonate, chain carbonate, cyclic carboxylate, chain carboxylate, cyclic ether, chain ether, a phosphorus-containing organic solvent, a sulfur-containing organic solvent, and an aromatic fluorine-containing solvent.

In some embodiments, the cyclic carbonate includes, but is not limited to, ethylene carbonate (ethylene carbonate, EC), propylene carbonate (propylene carbonate, PC), and butylene carbonate. In some embodiments, the cyclic carbonate contains 3~6 carbon atoms.

In some embodiments, the chain carbonate includes, but is not limited to, chain carbonate such as dimethyl carbonate, ethyl methyl carbonate, diethyl carbonate (DEC), methyl n-propyl carbonate, ethyl n-propyl carbonate, and di-n-propyl carbonate; and fluorine-substituted chain carbonate, such as bis(fluoromethyl)carbonate, bis(difluoromethyl)carbonate, bis(trifluoromethyl)carbonate, bis(2-fluoroethyl)carbonate, bis(2,2-difluoroethyl)carbonate, bis(2,2,2-trifluoroethyl)carbonate, 2-fluoroethyl methyl carbonate, 2,2-difluoroethyl methyl carbonate, and 2,2,2-trifluoroethyl methyl carbonate.

In some embodiments, the cyclic carboxylate includes, but is not limited to, gamma-butyrolactone and gamma-valerolactone. In some embodiments, a part of hydrogen atoms of the cyclic carboxylate may be substituted by fluorine.

In some embodiments, the chain carboxylate includes, but is not limited to, methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate, and ethyl pivalate. In some embodiments, a part of hydrogen atoms of the chain carboxylate may be substituted by fluorine. In some embodiments, the fluorine-substituted chain carboxylate includes, but is not limited to, methyl trifluoroacetate, ethyl trifluoroacetate, propyl trifluoroacetate, butyl trifluoroacetate, and 2,2,2-trifluoroethyl trifluoroacetate.

In some embodiments, the cyclic ether includes, but is not limited to, tetrahydrofuran, 2-methyl tetrahydrofuran, 1,3-dioxolane, 2-methyl1,3-dioxolane, 4-methyl 1,3-dioxolane, 1,3-dioxane, 1,4-dioxane, and dimethoxypropane.

In some embodiments, the chain ether includes, but is not limited to, dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, and 1,2-ethoxymethoxyethane.

In some embodiments, the phosphorus-containing organic solvent includes, but is not limited to, trimethyl phosphate, triethyl phosphate, dimethyl ethyl phosphate, methyl diethyl phosphate, ethylene methyl phosphate, ethylene ethyl phosphate, triphenyl phosphate, trimethyl phosphite, triethyl phosphite, triphenyl phosphite, tris(2,2,2-trifluoroethyl) phosphate, and tris(2,2,3,3,3)-pentafluoropropyl) phosphate.

In some embodiments, the sulfur-containing organic solvent includes, but is not limited to, sulfolane, 2-methyl sulfolane, 3-methyl sulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate, and dibutyl sulfate. In some embodiments, a part of hydrogen atoms of the sulfur-containing organic solvent may be substituted by fluorine.

In some embodiments, the aromatic fluorine-containing solvent includes, but is not limited to, fluorobenzene, difluorobenzene, trifluorobenzene, tetrafluorobenzene, pentafluorobenzene, hexafluorobenzene, and trifluoromethylbenzene.

In some embodiments, the solvent used in the electrolyte according to this application includes one or more of the foregoing. In some embodiments, the solvent used in the electrolyte according to this application includes cyclic carbonate, chain carbonate, cyclic carboxylate, chain carboxylate, and any combination thereof. In some embodiments, the solvent used in the electrolyte according to this application includes an organic solvent selected from groups consisting of: ethylene carbonate, propylene carbonate, diethyl carbonate, ethyl propionate, propyl propionate, n-propyl acetate, ethyl acetate, and any combination thereof. In some embodiments, the solvent used in the electrolyte according to this application includes: ethylene carbonate, propylene carbonate, diethyl carbonate, ethyl propionate, propyl propionate, gamma-butyrolactone, or any combination thereof.

Additives suitable for use in the electrolyte according to the embodiments of this application include, but are not limited to, a compound with 2 to 3 cyano groups, cyclic carbonate containing a carbon-carbon double bond, a compound containing a sulfur-oxygen double bond, and lithium difluorophosphate.

In some embodiments, the compound containing 2 to 3 cyano groups may include at least one of succinonitrile (SN), adiponitrile (ADN), ethylene glycol bis(propionitrile) ether (EDN), 1,3, 5-pentanetricarbonitrile, 1,2,3-propanetricarbonitrile, 1,3,6-hexanetricarbonitrile (HTCN), 1,2,6-hexanetricarbonitrile, 1,2,3-tris(2-cyanoethoxy)propane (TCEP), or 1,2,4-tris(2-cyanoethoxy)butane; based on the total weight of the electrolytic solution, the content of the compound containing 2 to 3 cyano groups is 0.1% to 10%.

In some embodiments, the cyclic carbonate containing a carbon-carbon double bond specifically includes, but is not limited to, at least one of: vinylene carbonate, methyl vinylene carbonate, ethyl vinylene carbonate, vinyl ethylene carbonate, or 1,2-dimethyl vinylene carbonate.

In some embodiments, the compound containing a sulfur-oxygen double bond includes, but is not limited to, at least one of: vinyl sulfate, 1,2-propylene glycol sulfate, 1,3-propane sultone, 1-fluoro-1,3-propane sultone, 2-fluoro-1,3-propane sultone, or 3-fluoro-1,3-propane sultone.

Separator

A separator may be disposed between the positive electrode and the negative electrode to prevent a short circuit. The material and the shape of the separator applicable to the embodiments of this application are not particularly limited, and may be based on any technology disclosed in the prior art. In some embodiments, the separator includes a polymer or an inorganic compound or the like formed from a material that is stable to the electrolyte according to this application.

For example, the separator may include a substrate layer and a surface treatment layer. The substrate layer is a non-woven fabric, film or composite film, which, in each case, have a porous structure. The material of the substrate layer is selected from at least one of polyethylene, polypropylene, polyethylene terephthalate, and polyimide. Specifically, the material of the substrate layer may be a polypropylene porous film, a polyethylene porous film, a polypropylene non-woven fabric, a polyethylene non-woven fabric, or a polypropylene-polyethylene-polypropylene porous composite film.

A surface treatment layer is disposed on at least one surface of the substrate layer. The surface treatment layer may be a polymer layer or an inorganic compound layer, or a layer formed by mixing a polymer and an inorganic compound.

The inorganic compound layer includes inorganic particles and a binder. The inorganic particles are selected from a combination of one or more of an aluminum oxide, a silicon oxide, a magnesium oxide, a titanium oxide, a hafnium dioxide, a tin oxide, a ceria, a nickel oxide, a zinc oxide, a calcium oxide, a zirconium oxide, an yttrium oxide, a silicon carbide, a boehmite, an aluminum hydroxide, a magnesium hydroxide, a calcium hydroxide, and a barium sulfate. The binder is selected from a combination of one or more of a polyvinylidene fluoride, a vinylidene fluoride-hexafluoropropylene copolymer, a polyamide, a polyacrylonitrile, a polyacrylate, a polyacrylic acid, a polyacrylate, a polyvinylpyrrolidone, a polyvinyl ether, a poly methyl methacrylate, a polytetrafluoroethylene, and a polyhexafluoropropylene.

The polymer layer includes a polymer, and the material of the polymer is at least one selected from a polyamide, a polyacrylonitrile, an acrylate polymer, a polyacrylic acid, a polyacrylate, a polyvinylpyrrolidone, a polyvinyl ether, a polyvinylidene fluoride, or a poly(vinylidene fluoride-hexafluoropropylene).

Electrochemical Device

The electrochemical device according this application includes any device in which an electrochemical reaction occurs. Specific examples of the device include all kinds of primary batteries, secondary batteries, fuel batteries, solar batteries, or capacitors. In particular, the electrochemical device is a lithium secondary battery, a sodium secondary battery, a zinc secondary battery, or the like. The lithium secondary battery may include a lithium metal secondary battery, a lithium-ion secondary battery, a lithium polymer secondary battery, or a lithium-ion polymer secondary battery.

Electronic Device

Another aspect of this application provides an electronic device, including the electrochemical device according to this application. The electrochemical device according to this application may be used for purposes not particularly limited, and may be used for any electronic device known in the prior art. In some embodiments, the electrochemical device according to this application is applicable to, but without limitation: a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

The following describes preparation of a lithium-ion battery as an example with reference to specific embodiments. A person skilled in the art understands that the preparation method described in this application are merely examples. Any other appropriate preparation methods fall within the scope of this application.

Embodiments

The following describes performance evaluation of the lithium-ion batteries according to the embodiments and comparative embodiments of this application.

I. Preparing a Lithium-Ion Battery

1. Preparing a Positive Electrode

When $LiCoO_2$ is used as a positive active material, a positive electrode is prepared by the following steps: mixing a specific amount of $Co_3O_4$ and lithium salt ($Li_2CO_3$) at molar ratio of Li:Co=approximately 1.05 to approximately 1.06, adding an oxide of the element M1 and/or an oxide of the element M2 into the mixture according to the formula specified in each embodiment and comparative embodiment; and stirring, sintering, and then crushing and sieving the mixture to obtain a lithium cobaltate positive electrode material.

When a $LiNi_{1/3}Co_{1/3}Mn_{1/3}O_2$ ternary material is used as a positive active material, a positive electrode is prepared by the following steps:

mixing $NiSO_4$, $CoSO_4$, and $MnSO_4$ at a molar ratio of 1:1:1 under an inert gas condition, adding ammonia to control the pH to fall between 10 and 12, and stirring at a speed of 20 rpm to 35 rpm to make the materials react evenly and co-precipitate; vacuum-filtering a resulting co-precipitate, and washing it with deionized water to obtain a precursor; then dry-mixing the precursor and LiOH, and sintering the mixture at 750° C. for 18 hours to obtain a $LiNi_{1/3}Co_{1/3}Mn_{1/3}O_2$ ternary material; and dissolving the positive active material, acetylene black, and polyvinylidene difluoride (PVDF) in N-methyl pyrrolidone (NMP) at a weight ratio of 97:1.5:1.5, and stirring and mixing well to obtain a positive slurry; and coating a positive current collector aluminum foil with the positive slurry, performing drying and cold calendering to obtain a positive active material layer, and then performing cutting and tab welding to obtain a positive electrode.

2. Preparing a Negative Electrode

A preparation method includes: stirring and mixing graphite, sodium carboxymethyl cellulose (CMC), and styrene butadiene rubber (SBR) thoroughly at a weight ratio of 97.5:1.5:1 in an appropriate amount of deionized water solvent to form a homogeneous negative slurry; coating a negative current collector copper foil with the negative slurry, and drying at 85° C.; and performing trimming, cutting, slitting, and drying to obtain a negative active material layer, and then performing cutting and tab welding to obtain a negative electrode.

3. Preparing an Electrolyte

A preparation method includes: in a dry argon atmosphere, adding $LiPF_6$ into a solvent, where the solvent is a mixture of propylene carbonate (PC), ethylene carbonate (EC), and diethyl carbonate (DEC) (mixed at a weight ratio of 1:1:1); and mixing the solution evenly to obtain a base electrolytic solution, where a concentration of $LiPF_6$ is 1.15 mol/L.

A method for preparing the electrolyte used in Embodiments 1 to 18 and 21 to 40 and Comparative Embodiments 1 to 5 includes: adding 4 wt % fluoroethylene carbonate (FEC), 3 wt % adiponitrile, and 1 wt % 1,3,6-hexane tricarbonitrile into the base electrolytic solution, and mixing them evenly to obtain the electrolytic solution.

A method for preparing the electrolyte used in Embodiment 19: adding 4 wt % fluoroethylene carbonate (FEC) and 4 wt % adiponitrile into the base electrolyte, and mixing them evenly to obtain the electrolyte.

A method for preparing the electrolyte used in Embodiment 20 includes: adding 4 wt % fluoroethylene carbonate (FEC), 3 wt % adiponitrile, and 0.6 wt % 1,3,6-hexane tricarbonitrile into the base electrolytic solution, and mixing them evenly to obtain the electrolyte.

4. Preparing a Separator

A PE porous polymer film is used as a separator.

5. Preparing a Lithium-Ion Battery

The preparation method includes: stacking the positive electrode, the separator, and the negative electrode sequentially, winding them, and putting them into an outer package; and injecting the electrolytic solution, and performing packaging; and performing steps such as chemical formation, degassing, and edge trimming to obtain a lithium-ion battery.

II. Test Methods

1. Method for Testing the Cycle Performance of the Lithium-Ion Battery (1) Test Method Under a 4.55 V Voltage The test method includes: charging the lithium-ion battery at a room temperature (25° C.) with a constant current of 0.7 C until the voltage reaches a cut-off voltage of 4.55 V, and then charging the battery at a constant voltage of 4.55 V until the current is lower than 0.05 C; and leaving the lithium-ion battery to be in a 4.55 V fully charged state; discharging the fully charged lithium-ion battery at a 1 C-rate until the voltage reaches 3V, thereby completing a charge-discharge cycle; and recording a discharge capacity D0 at this time; repeating the charge-discharge cycle until the discharge capacity attenuates to 80%; stopping the test, and recording the quantity of cycles and the discharge capacity D1;

calculating a capacity retention rate of the lithium-ion battery under conditions of 25° C. and 4.55 V according to the following formula:

$$\text{capacity retention rate } (25° C., 4.55 V) = D1/D0 \times 100\%; \text{ and}$$

measuring the quantity of cycles and the capacity retention rate of the lithium-ion battery under conditions of 45° C. and 4.55 V using basically the same method except that the test temperature is 45° C.

(2) Test Method Under a 4.3 V Voltage:

A thickness expansion rate of the lithium-ion battery under a voltage of 4.3 V is measured by basically the same method as the test method performed under a 4.55 V voltage except that the voltage of the fully charged lithium-ion battery is 4.3 V.

2. Method for Testing High-Temperature Storage Performance of the Lithium-Ion Battery (1) Test Method Under a 4.55 V Voltage:

The test method includes: measuring a thickness of the lithium-ion battery at a room temperature (25° C.), and recording the measured value as T0; charging the lithium-ion battery at a constant current of 0.5 C-rate until the voltage is higher than 4.55 V, and then charging the battery at a constant voltage of 4.55 V until the current is lower than 0.05 C; and leaving the battery to be in a 4.55 V fully charged state; leaving the fully charged battery in a 60° C. oven for 30 days, during which the battery is taken out for measuring thickness every other 3 days; and recording each measured thickness value, and averaging all the values after completion of the test to obtain an average value T1; and calculating the thickness expansion rate of the lithium-ion battery after 30-day storage under 60° C. according to the following formula:

$$\text{thickness expansion rate } (60° C., 30 \text{ days}, 4.55 V) = (T1 - T0)/T0 \times 100\%.$$

The test method includes: measuring the thickness of the lithium-ion battery at a room temperature (25° C.), and recording the measured value as T0; charging the lithium-ion battery at a constant current of 0.5 C-rate until the voltage is higher than 4.55 V, and then charging the battery at a constant voltage of 4.55 V until the current is lower than 0.05 C; and leaving the battery to be in a 4.55 V fully charged state; leaving the fully charged battery in an 80° C. oven for 24 hours, taking out the battery and measuring thickness immediately, and recording the measured thickness value as T1'; and calculating the thickness expansion rate of the lithium-ion battery after 24 hour storage under 80° C. according to the following formula:

$$\text{thickness expansion rate } (80° C., 24 \text{ hours}, 4.55 V) = (T1' - T0')/T0' \times 100\%.$$

(2) Test Method Under a 4.3 V Voltage:

A thickness expansion rate of the lithium-ion battery under a voltage of 4.3 V is measured by basically the same method as the test method performed under a 4.55 V voltage except that the voltage of the fully charged lithium-ion battery is 4.3 V.

III. Test Results

Table 1 and Table 2 show the composition of the positive electrode material of the lithium-ion battery in each embodiment and comparative embodiment, and the cycle performance and storage performance of the battery. The test results show that the layered structure in the positive electrode material and the strip-like structure containing an atom cluster in the layered structure are applicable to different types of positive active materials, and can improve the cycle performance and storage performance of the corresponding lithium-ion battery under a high voltage.

In each embodiment and comparative embodiment in Table 1, $LiCoO_2$ is used as a positive active material. The full-charge voltage of 4.55 V is a high-voltage operating condition for $LiCoO_2$.

As shown in Comparative Embodiment 1, when the positive electrode material of the lithium-ion battery lacks the interlayer structure consisting of the strip-like structure, the quantity of cycles of the lithium-ion battery under a high voltage (4.55 V) is relatively small, and the thickness expansion rate of the lithium-ion battery under high-temperature storage is relatively high. As shown in Comparative Embodiment 2, the positive electrode material contains the element M1 but the element M1 does not exist between two adjacent layers in the strip-like structure. Therefore, the positive electrode material is unable to form the interlayer structure consisting of the strip-like structure, the quantity of cycles of the lithium-ion battery under a high voltage (4.55 V) is relatively small, and the thickness expansion rate of the lithium-ion battery under high-temperature storage is relatively high. As shown in Comparative Embodiment 3, the positive electrode material contains just one element M2, and is unable to form the interlayer structure consisting of the strip-like structure. Therefore, the quantity of cycles of the lithium-ion battery under a high voltage (4.55 V) is relatively small, and the thickness expansion rate of the lithium-ion battery under high-temperature storage is relatively high. The quantity of cycles of the lithium-ion battery under a high voltage (4.55 V) and the thickness expansion rate under high-temperature storage are a little improved, but are still inferior.

As shown in Embodiments 1 to 23, when the positive electrode material of the lithium-ion battery is a layered structure and a strip-like structure containing an atom cluster exists in the layered structure, the quantity of cycles of the lithium-ion battery under a high voltage (4.55 V) is increased significantly, and the thickness expansion rate of the lithium-ion battery under high-temperature storage is decreased significantly.

When the content of the element M1 in the positive electrode material is within a range of 0.08 wt % to 0.5 wt % and the content of the element M2 in the positive electrode material is within a range of 0.04 wt % to 0.5 wt %, the quantity of cycles of the lithium-ion battery under a high voltage (4.55 V) and the thickness expansion rate under high-temperature storage are further improved. When the total thickness of the layered structure is less than or equal to 10 nm, the quantity of cycles of the lithium-ion battery under a high voltage (4.55 V) and the thickness expansion rate under high-temperature storage are further improved. When the Dv99:Dv50 ratio of the lithium cobaltate is within a range of 2.2 to 2.8, the quantity of cycles of the lithium-ion battery under a high voltage (4.55 V) and the thickness expansion rate under high-temperature storage are further improved.

In each embodiment and comparative embodiment in Table 2, a $LiNi_{1/3}Co_{1/3}Mn_{1/3}O_2$ ternary material is used as a positive active material. The full-charge voltage of 4.3 V is a high-voltage operating condition for the $LiNi_{1/3}Co_{1/3}Mn_{1/3}O_2$ ternary material.

As shown in Comparative Embodiment 4, when the positive electrode material of the lithium-ion battery lacks the interlayer structure consisting of the strip-like structure, the quantity of cycles of the lithium-ion battery under a high voltage (4.3 V) is relatively small, and the thickness expansion rate of the lithium-ion battery under high-temperature storage is relatively high. As shown in Comparative Embodiment 5, the positive electrode material contains just one element M2, and is unable to form the interlayer structure consisting of the strip-like structure. Therefore, the quantity of cycles of the lithium-ion battery under a high voltage (4.3 V) and the thickness expansion rate under high-temperature storage are a little improved, but are still inferior.

As shown in Embodiments 24 to 40, when the positive electrode material of the lithium-ion battery is a layered structure and a strip-like structure containing an atom cluster exists in the layered structure, the quantity of cycles of the lithium-ion battery under a high voltage (4.3 V) is increased significantly, and the thickness expansion rate of the lithium-ion battery under high-temperature storage is decreased significantly. When the content of the element M1 in the positive electrode material is within a range of 0.08 wt % to 0.5 wt % and the content of the element M2 in the positive electrode material is within a range of 0.04 wt % to 0.5 wt %, the quantity of cycles of the lithium-ion battery under a high voltage (4.3 V) and the thickness expansion rate under high-temperature storage are further improved.

When the total thickness of the layered structure is less than or equal to 10 nm, the quantity of cycles of the lithium-ion battery under a high voltage (4.3 V) and the thickness expansion rate under high-temperature storage are further improved. When the Dv99:Dv50 ratio of the ternary material is within a range of 2.2 to 2.8, the quantity of cycles of the lithium-ion battery under a high voltage (4.3 V) and the thickness expansion rate under high-temperature storage are further improved.

TABLE 1

|  | Does the strip-like structure containing an atom cluster exist? | Is element M1 contained in the layered structure? | Is element M1 contained in the positive electrode material? | Type and content of element M1 | | Is element M2 contained in the positive electrode material? | Type and content of element M2 | | | |
|---|---|---|---|---|---|---|---|---|---|---|
|  |  |  |  | Y (wt %) | Ca (wt %) |  | La (wt %) | Zr (wt %) | Ho (wt %) | Sc (wt %) |
| Comparative Embodiment 1 | No | No | No | — | — | No | — | — | — | — |
| Comparative Embodiment 2 | No | Yes | No | 0.05 | — | Yes | 0.15 | — | — | — |
| Comparative Embodiment 3 | No | No | No | — | — | Yes | 0.05 | 0.05 | 0.05 | — |
| Embodiment 1 | Yes | Yes | Yes | 0.05 | — | Yes | 0.05 | — | 0.05 | 0.05 |
| Embodiment 2 | Yes | Yes | Yes | 0.10 | — | Yes | 0.05 | 0.05 | 0.05 | — |
| Embodiment 3 | Yes | Yes | Yes | 0.10 | — | Yes | 0.05 | 0.05 | — | — |

TABLE 1-continued

| | | | | | | | | | | |
|---|---|---|---|---|---|---|---|---|---|---|
| Embodiment 4 | Yes | Yes | Yes | 0.10 | — | Yes | 0.05 | 0.025 | — | 0.025 |
| Embodiment 5 | Yes | Yes | Yes | — | 0.05 | Yes | 0.05 | 0.05 | — | — |
| Embodiment 6 | Yes | Yes | Yes | — | 0.05 | Yes | 0.05 | 0.05 | — | 0.025 |
| Embodiment 7 | Yes | Yes | Yes | — | 0.10 | Yes | — | 0.05 | 0.025 | 0.025 |
| Embodiment 8 | Yes | Yes | Yes | 0.10 | — | Yes | 0.05 | — | 0.025 | 0.025 |
| Embodiment 9 | Yes | Yes | Yes | 0.075 | — | Yes | 0.05 | 0.05 | — | 0.025 |
| Embodiment 10 | Yes | Yes | Yes | 0.05 | 0.1 | Yes | 0.05 | 0.05 | — | — |
| Embodiment 11 | Yes | Yes | Yes | 0.025 | 0.05 | Yes | 0.10 | 0.05 | 0.05 | — |
| Embodiment 12 | Yes | Yes | Yes | 0.20 | — | Yes | 0.10 | 0.025 | 0.05 | — |
| Embodiment 13 | Yes | Yes | Yes | 0.50 | — | Yes | 0.25 | 0.25 | — | — |
| Embodiment 14 | Yes | Yes | Yes | 0.15 | 0.05 | Yes | 0.10 | 0.05 | — | — |
| Embodiment 15 | Yes | Yes | Yes | 0.15 | 0.05 | Yes | 0.10 | 0.05 | — | — |
| Embodiment 16 | Yes | Yes | Yes | 0.10 | — | Yes | 0.05 | 0.025 | — | 0.025 |
| Embodiment 17 | Yes | Yes | Yes | 0.10 | — | Yes | 0.025 | 0.05 | 0.05 | — |
| Embodiment 18 | Yes | Yes | Yes | 0.10 | — | Yes | 0.025 | 0.05 | 0.05 | — |
| Embodiment 19 | Yes | Yes | Yes | 0.10 | — | Yes | 0.05 | 0.05 | 0.05 | — |
| Embodiment 20 | Yes | Yes | Yes | 0.10 | — | Yes | 0.05 | 0.05 | 0.05 | — |
| Embodiment 21 | Yes | Yes | Yes | 0.03 | — | Yes | 0.02 | 0.02 | — | — |
| Embodiment 22 | Yes | Yes | Yes | 0.2 | — | Yes | 0.25 | 0.17 | 0.2 | — |
| Embodiment 23 | Yes | Yes | Yes | 0.30 | 0.30 | Yes | 0.05 | 0.025 | 0.025 | — |

| | Sum of total thickness of strip-like structures and spacing between strip-like structures (nm) | Dv99:Dv50 | Quantity of cycles under 4.55 V | | Thickness expansion rate under 4.55 V storage | |
|---|---|---|---|---|---|---|
| | | | 25° C. | 45° C. | 30 days at 60° C. | 24 hours at 80° C. |
| Comparative Embodiment 1 | — | 2.1 | 300 | 50 | 30% | 80% |
| Comparative Embodiment 2 | — | 3.2 | 340 | 60 | 25% | 66% |
| Comparative Embodiment 3 | 3 | 2.3 | 330 | 57 | 23% | 69% |
| Embodiment 1 | 5 | 2.5 | 450 | 70 | 20% | 40% |
| Embodiment 2 | 10 | 2.6 | 650 | 100 | 10% | 25% |
| Embodiment 3 | 6 | 2.4 | 600 | 87 | 12% | 33% |
| Embodiment 4 | 9 | 2.5 | 630 | 90 | 13% | 30% |
| Embodiment 5 | 6 | 2.4 | 500 | 77 | 22% | 34% |
| Embodiment 6 | 5 | 2.7 | 550 | 79 | 20% | 35% |
| Embodiment 7 | 6 | 2.6 | 600 | 90 | 14% | 30% |
| Embodiment 8 | 8 | 2.8 | 620 | 88 | 15% | 33% |
| Embodiment 9 | 7 | 2.8 | 630 | 88 | 19% | 38% |
| Embodiment 10 | 8 | 2.3 | 635 | 110 | 15% | 20% |
| Embodiment 11 | 5 | 2.4 | 400 | 50 | 10% | 13% |
| Embodiment 12 | 8 | 2.6 | 550 | 75 | 10% | 15% |
| Embodiment 13 | 8 | 2.6 | 450 | 50 | 10% | 15% |
| Embodiment 14 | 11 | 2.8 | 500 | 50 | 8% | 12% |
| Embodiment 15 | 8 | 2.8 | 600 | 70 | 10% | 16% |
| Embodiment 16 | 9 | 2.1 | 450 | 60 | 25% | 60% |
| Embodiment 17 | 8 | 2.4 | 550 | 70 | 10% | 20% |
| Embodiment 18 | 8 | 3.7 | 450 | 60 | 18% | 24% |
| Embodiment 19 | 10 | 2.6 | 610 | 90 | 16% | 30% |
| Embodiment 20 | 10 | 2.6 | 640 | 96 | 12% | 27% |
| Embodiment 21 | 5 | 2.5 | 400 | 50 | 25% | 55% |
| Embodiment 22 | 8 | 2.6 | 550 | 80 | 15% | 25% |
| Embodiment 23 | 8 | 2.8 | 580 | 70 | 18% | 36% |

TABLE 2

| | Does the strip-like structure containing an atom cluster exist? | Is element M1 contained in the layered structure? | Is element M1 contained between two adjacent layers in strip-like structure? | Type and content of element M1 | | Is element M2 contained in the positive electrode material? | Type and content of element M2 | | | |
|---|---|---|---|---|---|---|---|---|---|---|
| | | | | Y (wt %) | Ca (wt %) | | La (wt %) | Zr (wt %) | Ho (wt %) | Sc (wt %) |
| Comparative Embodiment 4 | No | No | No | — | — | No | — | — | — | — |
| Comparative Embodiment 5 | No | No | No | — | — | Yes | 0.05 | 0.05 | — | — |

TABLE 2-continued

| | | | | | | | | | | |
|---|---|---|---|---|---|---|---|---|---|---|
| Embodiment 24 | Yes | Yes | Yes | 0.05 | — | Yes | 0.05 | 0.025 | 0.025 | — |
| Embodiment 25 | Yes | Yes | Yes | 0.05 | — | Yes | 0.05 | 0.05 | — | 0.05 |
| Embodiment 26 | Yes | Yes | Yes | — | 0.05 | Yes | 0.05 | 0.05 | — | 0.025 |
| Embodiment 27 | Yes | Yes | Yes | — | 0.10 | Yes | 0.05 | 0.05 | — | 0.025 |
| Embodiment 28 | Yes | Yes | Yes | — | 0.08 | Yes | 0.05 | 0.05 | — | 0.04 |
| Embodiment 29 | Yes | Yes | Yes | — | 0.02 | Yes | 0.05 | 0.05 | — | 0.025 |
| Embodiment 30 | Yes | Yes | Yes | — | 0.08 | Yes | 0.04 | — | 0.04 | — |
| Embodiment 31 | Yes | Yes | Yes | — | 0.20 | Yes | 0.04 | — | — | 0.08 |
| Embodiment 32 | Yes | Yes | Yes | — | 0.04 | Yes | 0.20 | 0.10 | — | — |
| Embodiment 33 | Yes | Yes | Yes | — | 0.25 | Yes | 0.02 | — | 0.08 | — |
| Embodiment 34 | Yes | Yes | Yes | 0.10 | 0.025 | Yes | 0.01 | 0.01 | 0.025 | — |
| Embodiment 35 | Yes | Yes | Yes | 0.20 | — | Yes | 0.025 | 0.025 | — | 0.05 |
| Embodiment 36 | Yes | Yes | Yes | 0.05 | 0.10 | Yes | 0.01 | 0.025 | — | 0.025 |
| Embodiment 37 | Yes | Yes | Yes | 0.05 | 0.05 | Yes | — | 0.01 | 0.025 | 0.025 |
| Embodiment 38 | Yes | Yes | Yes | 0.25 | 0.25 | Yes | 0.25 | 0.25 | — | — |
| Embodiment 39 | Yes | Yes | Yes | 0.05 | 0.10 | Yes | 0.01 | 0.025 | — | 0.025 |
| Embodiment 40 | Yes | Yes | Yes | 0.05 | 0.05 | Yes | — | 0.01 | 0.025 | 0.025 |

| | Sum of total thickness of strip-like structures and spacing between strip-like structures (nm) | | Quantity of cycles under 4.3 V | | Thickness expansion rate under 4.3 V storage | |
|---|---|---|---|---|---|---|
| | | Dv99:Dv50 | 25° C. | 45° C. | 30 days at 60° C. | 24 hours at 80° C. |
| Comparative Embodiment 4 | — | 2.1 | 700 | 300 | 35% | 90% |
| Comparative Embodiment 5 | 2 | 2.3 | 750 | 320 | 30% | 80% |
| Embodiment 24 | 5 | 2.5 | 1000 | 550 | 9% | 55% |
| Embodiment 25 | 10 | 2.8 | 1050 | 560 | 8% | 45% |
| Embodiment 26 | 5 | 2.6 | 900 | 450 | 9% | 51% |
| Embodiment 27 | 6 | 2.7 | 950 | 500 | 9% | 50% |
| Embodiment 28 | 8 | 2.7 | 1100 | 570 | 9% | 43% |
| Embodiment 29 | 10 | 2.7 | 1000 | 550 | 9% | 45% |
| Embodiment 30 | 7 | 2.5 | 950 | 500 | 9% | 55% |
| Embodiment 31 | 9 | 2.5 | 1000 | 500 | 9% | 45% |
| Embodiment 32 | 4 | 2.4 | 900 | 450 | 9% | 50% |
| Embodiment 33 | 8 | 2.5 | 1000 | 500 | 9% | 45% |
| Embodiment 34 | 7 | 2.4 | 1000 | 400 | 10% | 55% |
| Embodiment 35 | 7 | 2.5 | 900 | 400 | 15% | 40% |
| Embodiment 36 | 15 | 2.4 | 800 | 400 | 9% | 55% |
| Embodiment 37 | 9 | 3.3 | 950 | 500 | 10% | 30% |
| Embodiment 38 | 7 | 2.5 | 900 | 500 | 15% | 25% |
| Embodiment 39 | 7 | 2.4 | 1000 | 500 | 7% | 35% |
| Embodiment 40 | 9 | 2.6 | 1000 | 550 | 8% | 23% |

References to "embodiments", "some embodiments", "an embodiment", "another example", "example", "specific example" or "some examples" throughout the specification mean that at least one embodiment or example in this application includes specific features, structures, materials, or characteristics described in the embodiment(s) or example(s). Therefore, descriptions throughout the specification, which make references by using expressions such as "in some embodiments", "in an embodiment", "in one embodiment", "in another example", "in an example", "in a specific example", or "example", do not necessarily refer to the same embodiment or example in this application. In addition, specific features, structures, materials, or characteristics herein may be combined in one or more embodiments or examples in any appropriate manner.

Although illustrative embodiments have been demonstrated and described above, a person skilled in the art understands that the above embodiments shall not be construed as a limitation on this application, and changes, replacements, and modifications may be made to the embodiments without departing from the spirit, principles, and scope of this application.

What is claimed is:

1. A positive electrode material, wherein the positive electrode material has a layered structure, and the layered structure comprises a plurality of strip-like structure layers and a spacing between two adjacent strip-like structure layers, wherein each of the strip-like structure layers contains atom clusters;
   wherein an element M1 is contained in the spacing between two adjacent strip-like structure layers in the layered structure, and the element M1 comprises at least one of Y or Ca; and
   wherein the atom cluster contains an element M2, and the element M2 comprises at least two of La, Ho, Zr, Sc, W, Ce, Mo, Nb, Hf, Zn, or Ti.

2. The positive electrode material according to claim 1, wherein the positive electrode material is characterized by at least one of the following characteristics (d) to (e):
   (d) the spacing between two adjacent strip-like structure layers is within a range of 0.5 nm to 0.75 nm; or
   (e) a thickness of the layered structure is less than or equal to 10 nm.

3. The positive electrode material according to claim 1, wherein the positive electrode material is characterized by at least one of the following characteristics (f) to (g):
(f) based on a total weight of the positive electrode material, a content of the element M1 is within a range of 0.08 wt % to 0.5 wt %; or
(g) based on the total weight of the positive electrode material, a content of the element M2 is within a range of 0.04 wt % to 0.5 wt %.

4. The positive electrode material according to claim 1, wherein the layered structure comprises an oxide of the element M1 and an oxide of the element M2, and the element M1 comprises Ca.

5. The positive electrode material according to claim 1, further comprising a lithium cobalt oxide, wherein the lithium cobalt oxide is characterized by at least one of the following characteristics (h) to (i):
h) a Dv99:Dv50 ratio of the positive electrode material is within a range of 2.2 to 2.8; or
i) the lithium cobalt oxide comprises lithium cobaltate.

6. The positive electrode material according to claim 1, comprising a ternary material, wherein the ternary material comprises at least one of $LiNi_aCo_bMn_cO_2$ or $LiNi_dCo_eAl_fO_2$, wherein a+b+c≤1, 0<a<1, 0<b<1, 0<c<1; and d+e+f≤1, wherein 0<d<1, 0<e<1, 0<f<1; and a Dv99:Dv50 ratio of the positive electrode material is within a range of 2.2 to 2.8.

7. An electrochemical device, comprising a positive electrode, a negative electrode, and an electrolytic solution, wherein the positive electrode comprises the positive electrode material, wherein the positive electrode material has a layered structure, and the layered structure comprises a plurality of strip-like structure layers and a spacing between two adjacent strip-like structure layers, wherein each of the strip-like structure layers contains an atom clusters;
wherein an element M1 is contained in the spacing between two adjacent strip-like structure layers in the layered structure, and the element M1 comprises at least one of Y or Ca; and
wherein the atom cluster contains an element M2, and the element M2 comprises at least two of La, Ho, Zr, Sc, W, Ce, Mo, Nb, Hf, Zn, or Ti.

8. The electrochemical device according to claim 7, wherein the positive electrode material is characterized by at least one of the following characteristics (d) to (e):
(d) the spacing between two adjacent strip-like structure layers is within a range of 0.5 nm to 0.75 nm; or
(e) a thickness of the layered structure is not greater than 10 nm.

9. The electrochemical device according to claim 7, wherein the positive electrode material is characterized by at least one of the following characteristics (f) to (g):
(f) based on a total weight of the positive electrode material, a content of the element M1 is within a range of 0.08 wt % to 0.5 wt %; or
(g) based on the total weight of the positive electrode material, a content of the element M2 is within a range of 0.04 wt % to 0.5 wt %.

10. The electrochemical device according to claim 7, wherein the layered structure comprises an oxide of the element M1 and an oxide of the element M2, and the element M1 comprises Ca.

11. The electrochemical device according to claim 7, comprising a lithium cobalt oxide, wherein the lithium cobalt oxide is characterized by at least one of the following characteristics (h) to (i):
h) a Dv99:Dv50 ratio of the positive electrode material is within a range of 2.2 to 2.8; or
i) the lithium cobalt oxide comprises lithium cobaltate.

12. The electrochemical device according to claim 7, comprising a ternary material, wherein the ternary material comprises at least one of $LiNi_aCo_bMn_cO_2$ or $LiNi_dCo_eAl_fO_2$, wherein a+b+c≤1, 0<a<1, 0<b<1, 0<c<1; and d+e+f≤1, wherein 0<d<1, 0<e<1, 0<f<1; and a Dv99:Dv50 ratio of the positive electrode material is within a range of 2.2 to 2.8.

13. An electronic device, comprising the electrochemical device, the electrochemical device comprises a positive electrode, a negative electrode, and an electrolytic solution, wherein the positive electrode comprises the positive electrode material, wherein the positive electrode material have a layered structure, and the layered structure comprises a plurality of strip-like structure layers and a spacing between two adjacent strip-like structure layers, wherein each of the strip-like structure layers contains atom clusters;
wherein an element M1 is contained in the spacing between two adjacent strip-like structure layers in the layered structure, and the element M1 comprises at least one of Y or Ca; and
wherein the atom cluster contains an element M2, and the element M2 comprises at least two of La, Ho, Zr, Sc, W, Ce, Mo, Nb, Hf, Zn, or Ti.

14. The electronic device according to claim 13, wherein the positive electrode material is characterized by at least one of the following characteristics (d) to (e):
(d) the spacing between two adjacent strip-like structure layers is within a range of 0.5 nm to 0.75 nm; or
(e) a thickness of the layered structure is not greater than 10 nm.

\* \* \* \* \*